A. Seltzer,
Provision Safe,
Nº 1,774. Patented Sept. 5, 1840.

UNITED STATES PATENT OFFICE.

ADAM SELTZER, OF BALTIMORE, MARYLAND.

APPARATUS FOR PRESERVING AND HOLDING BUTCHERS' MEAT IN MARKET-PLACES.

Specification of Letters Patent No. 1,774, dated September 5, 1840.

*To all whom it may concern:*

Be it known that I, ADAM SELTZER, of the city of Baltimore and State of Maryland, have invented a new and useful Apparatus for Preserving Meat and Facilitating the Operations of the Victualer at the Market-House, called the "Victualerator," which is described as follows, reference being had to the annexed drawings of the same, making part of this specification.

Figure 1:
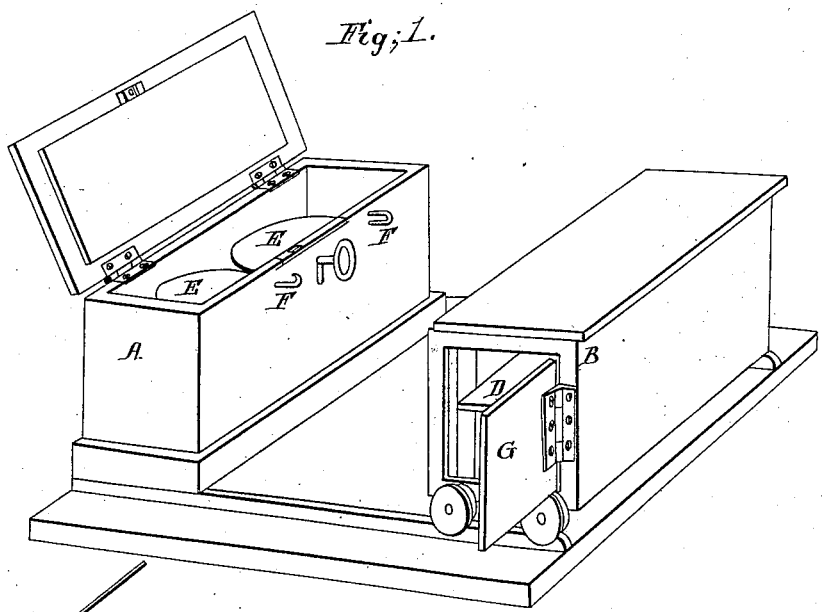
Figure 3:
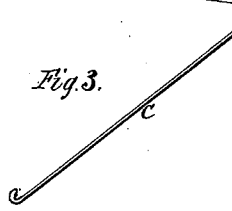
Figure 2:
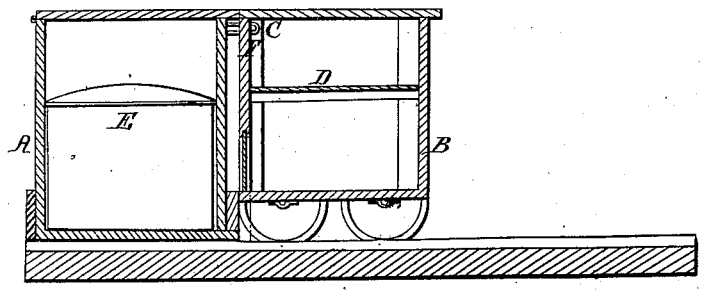

Figure 1 is a perspective view of the refrigerator with its lid raised and of the bench as drawn out for use. Fig. 2 is a vertical cross section. Fig. 3 the bolt.

Similar letters refer to similar parts in the figures.

It is no doubt well understood that in the season of summer or very warm weather that the butcher experiences a great loss from the rapid decay of the meat which takes place: and when his business is extensive the loss of time and bodily exertion is very considerable in transferring large hogs and pieces of meat from the cart to the stall and also in shifting the position of the tools, scales, &c.

Now the nature of my invention is to remove these evils and it consists in a combination and use of two rectangular boxes A and B, one of them A being made stationary in the market house in which the meat is preserved and is constructed on the principles of a refrigerator; and the other marked B is made movable on casters or wheels in front of the last named box or refrigerator used as the block or bench on which the meat is cut and in which the tools, scales, weights, &c., are contained when not in use when it is run back against the refrigerator with the aforesaid articles therein and is locked to it by a lock bolt $c$. And when it is required to be used it is unlocked and run out in front of the refrigerator between which and the block the butcher stands while serving his customers.

The lock of the refrigerator is made like a common chest lock and is used in the same manner. The lock-bolt which secures the block to the refrigerator is simply a bolt $c$ Figs. 2 and 3 passed through staples F projecting from the side of the refrigerator into the bench.

A small door G at one end of the bench is made to turn on hinges and is fastened with a common lock which shuts off all access to the bolt.

The movable bench is furnished with shelves D for the articles to be put thereon. Said movable bench is also used for conveying large hogs and pieces of meat thereon from the cart to the market stand.

The tubs E in which the meat is salted are made of zinc with lids of the same material and are placed within the refrigerator surrounded with ice. The fresh meat remaining unsold or any of other pieces of meat are then placed upon the ice and over the whole is put a blanket. The said zinc tubs are combined with and accompanying the refrigerator. The salting may be performed at the market house. Meat kept in this apparatus a short time will have its flavor much improved.

What I claim as my invention and which I desire to secure by Letters Patent consists in—

The before described combination of the refrigerator, zinc salting tubs, and motive block for the use of victualers at the market house or other places.

ADAM SELTZER.

Witnesses:
 WM. P. ELLIOT,
 E. MARREN.